US008661162B2

United States Patent
Giles et al.

(10) Patent No.: US 8,661,162 B2
(45) Date of Patent: Feb. 25, 2014

(54) ADDRESS HANDLING

(75) Inventors: Chris M. Giles, Ft. Collins, CO (US);
Bryan Hornung, Richardson, TX (US);
Michael J. Phelps, Ft. Collins, CO (US);
Joseph F. Orth, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2061 days.

(21) Appl. No.: 11/588,903

(22) Filed: Oct. 26, 2006

(65) Prior Publication Data

US 2008/0147888 A1 Jun. 19, 2008

(51) Int. Cl.
*G06F 3/00* (2006.01)

(52) U.S. Cl.
USPC .......................................................... 710/3

(58) Field of Classification Search
USPC .......................................................... 710/3
See application file for complete search history.

(56) References Cited

U.S. PATENT DOCUMENTS

| 6,237,078 | B1 * | 5/2001 | Gray | 712/32 |
| 6,559,850 | B1 * | 5/2003 | Strongin et al. | 345/520 |
| 2007/0286152 | A1 * | 12/2007 | Prakash et al. | 370/349 |

FOREIGN PATENT DOCUMENTS

| JP | 62-28850 | 2/1987 |
| JP | 4-241047 | 8/1992 |
| JP | 8-6893 | 1/1996 |

* cited by examiner

*Primary Examiner* — Farley Abad

(57) ABSTRACT

One exemplary method of assigning addresses in two or more address spaces with address fields of different lengths comprises defining address types, assigning a value to first bits at the high ends of the address fields to identify a first said address type, assigning second bits at the low ends of the address fields to identify addresses of the first said address type, and inserting different numbers of additional bits between the first bits and the second bits in the two or more address spaces.

13 Claims, 3 Drawing Sheets

ADDRESS HANDLING

BACKGROUND

Many computing and communications systems use an addressing system in which the most significant bit or bits of an address space are range bits identifying a range of addresses, and less significant bits are address bits identifying an address within the range. The address range may identify, for example, a type of device or resource, and the address bits may identify, for example, an address within the specified device or resource. Where several resources of the same type are present, the address bits may identify a specific resource, and an address within the specific resource.

Even quite similar computing systems may have address spaces of different sizes, and the size of address spaces is increasing over time as the real cost of hardware resources decreases.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, examples of which are illustrated in the accompanying drawings.

Figure 1:
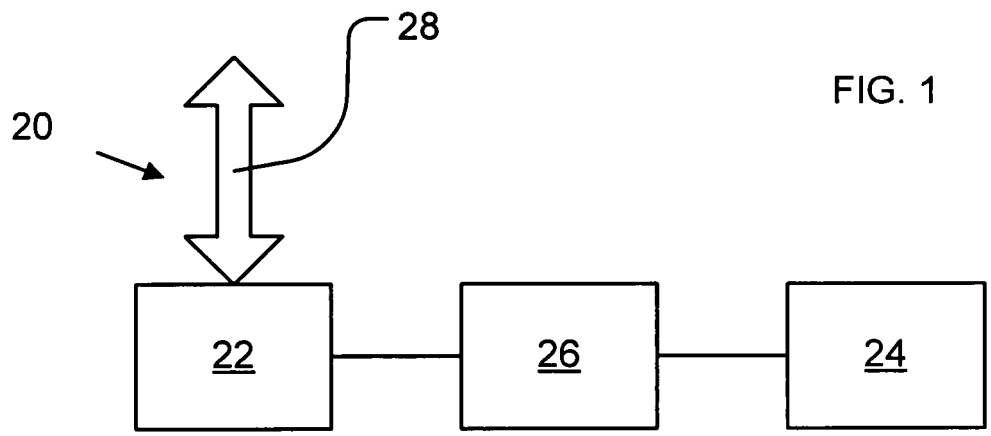
FIG. 1 is a block diagram of part of a first embodiment of a computing system.

Referring to the accompanying drawings, and initially to FIG. 1, one form of computer system, indicated generally by the reference number 20, comprises a central electronics complex (CEC) 22, which routes and manages communications traffic between other resources and devices. The other resources and devices may include, for example, a CPU 24, memory 26, and a bus or other I/O 28.

In use, the CEC 22 receives messages from other resources 24, 26, 28. The CEC routes the messages, and may also log or otherwise process the messages. The CEC 22 may also translate message addresses between different address spaces.

Figure 2:
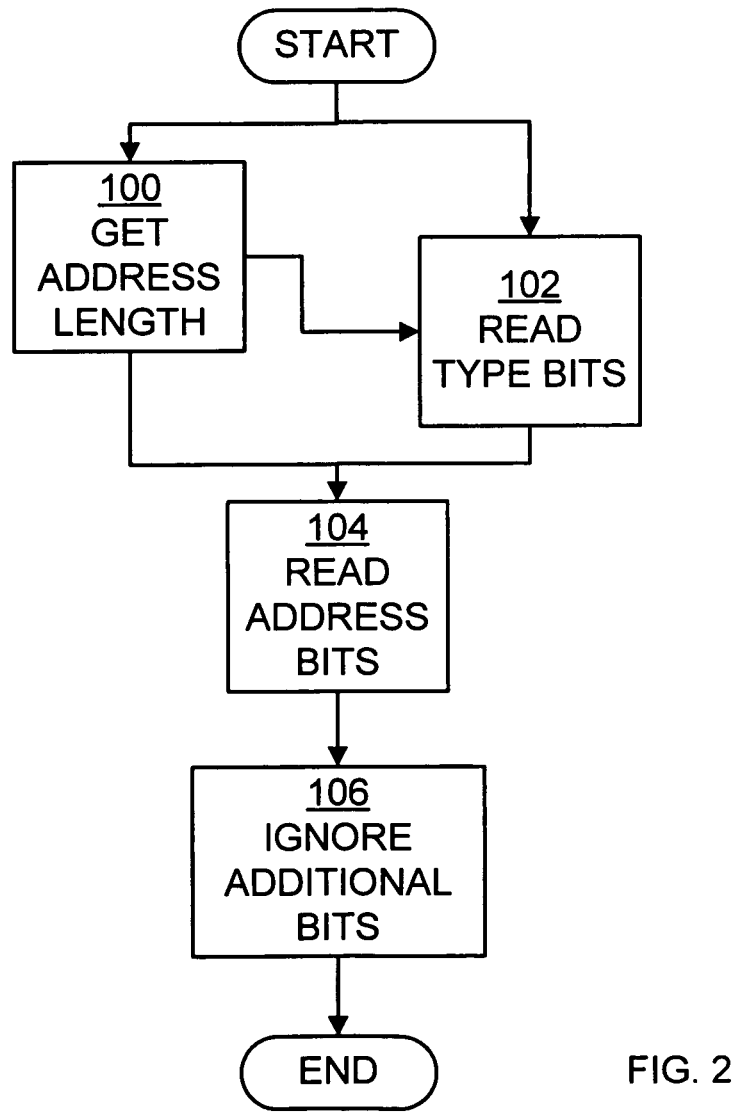
FIG. 2 is a flowchart of a first embodiment of a method.

Referring also to FIG. 2, in step 100 the CEC gets the address length for the specific address to be interpreted, and in step 102 the CEC 22 reads the type bits of the address field in an incoming message, which enable the CEC 22 to identify the type of device or other resource to which the message is directed.

Depending on the addressing scheme and message format, the type bits may be readable without already knowing the address length, or the address length may be used in locating the type bits. These options are symbolically shown in FIG. 2 by assigning step 100 the lower number, but by showing alternative paths through the flowchart.

In step 104, the CEC 22 reads a number of less significant bits forming an address appropriate to the resource type and the address field length. The bits read in step 104 may be fewer than all of the meaningful bits not read in step 102. For example, where the address identifies a destination device and a destination address within a block or region of addresses assigned to the destination device, it may be sufficient for the CEC 22 to resolve the address block or address region. The choice of bits may depend on the address type, the address field length, or both.

In step 106, where the sum of the numbers of meaningful bits in the address type and in the address is less than the length of the address field, an appropriate number of additional bits in the address field, which in this embodiment are between the address type and the address are ignored or discarded. Where the address contains a distinct region and address, the ignored bits may be between the address type and the address region, between the address region and the address, or both.

The CEC 22 is equipped to handle address fields of more than one length, and to produce an output for a selected address field length. For example, the address space size or address field length may be signaled when the CEC receives a message, or that information may be loaded as part of a system configuration or startup procedure. Where the incoming I/O connection 28 carries messages formatted for more than one address space size, for example, in a packet-based system, the CEC may be programmed to read and recognize a packet header type, and apply an address field length assigned to a specific packet header type.

Referring to TABLE 1, there is shown one example of how an address space within a partition of a computing system may be structured. The address field in Table 1 is 40 bits wide, giving 1 terabyte of total address space.

TABLE 1

| Description | 39 | 38 | 37 | 36 | 35 | 34:0 |
|---|---|---|---|---|---|---|
| SPEC | 1 | 1 | 1 | | | Special Address [36:0] |
| MEM1 | 1 | Mem R [2:0] | | | | Memory Region Address [35:0] |
| IO | 1 | 0 | IO R [2:0] | | | IO Region Address [34:0] |
| MEM0 | 0 | 0 | 0 | 0 | | Memory Region Address [35:0] |

In Table 1:
SPEC = Privileged space occupies the top 128 GB of address space, regardless of the size of the address space.
MEM1 = Memory 1 provides address space for 8 memory resources, each with 64 GB of address space. Only 2 entries are actually available, because the allocated address range overlaps with those assigned to SPEC and to I/O devices.
IO = I/O devices provides address space for 8 I/O devices, each with 32 GB of address space.
MEM0 = Memory 0 provides 64 GB of zero-based address space, mostly for generally-available memory.

As shown in Table 1, the address ranges for the various address types are represented by the individual bits shown in the left-hand (most significant) places. The number of bits defining the address range may be different for different ranges. Address ranges for different types may overlap, as shown for the MEM1 and IO address types, provided that a suitable rule is applied to ensure that no actual address is assigned to both ranges. For example, as shown for the MEM1 and IO address types in Table 1, the IO address range is assigned part of the MEM1 address range, and the addresses in the region of overlap are actually assigned to the smaller (IO) address range.

As shown in Table 1, the addresses within an address range may be subdivided, so that the address range provides regions (R) of addresses for a number of discrete resources, and an address within the region assigned to each resource.

As shown in Table 1, the whole of the 1 TB address space is allocated to address ranges, except for a 448 GB block between the bottom of IO and the top of MEM0.

Table 2 shows one example of how an address space within a partition of a computing system may be structured, using the same general structure as in Table 1, with an address field 43 bits wide, giving a total address space of 8 TB. In the interests of conciseness, the description of parts of Table 2 that are substantially the same as Table 1 will not be repeated.

TABLE 2

| Desc | 42 | 41 | 40 | 39 | 38 | 37 | 36 | 35:0 |
|------|----|----|----|----|----|----|----|------|
| SPEC | 1  | 1  | 1  | 1  | 1  | 1  |    | Special Address [36:0] |
| MEM1 | 1  | Memory Region [5:0] | | | | | | Memory Region Address [35:0] |
| IO   | 1  | 0  | IO Region [4:0] | | | | | IO Region Address [35:0] |
| MEM2 | 0  | 0  | 0  | 1  | Mem. R [2:0] | | | Memory Region Address [35:0] |
| MEM0 | 0  | 0  | 0  | 0  | 0  | 0  | 0  | Memory Region Address [35:0] |

As is shown by a comparison of Tables 1 and 2, the address ranges are defined by identical most significant bits for address types MEM1 and IO. In the example shown in Table 2, additional address space is used to increase either the number or the size of the address blocks within each address range, compared with the numbers and sizes in Table 1. Alternatively, both the number of blocks and the size of each block may be increased to a lesser extent. Thus, for these address types, the left-hand bits provide a decode pattern that, in changing from the address space of Table 1 to the address space of Table 2, is shifted further to the left but is not altered.

Address type MEM0 does not require additional address space, and the address type bits for that type are therefore not simply moved to remain in the most significant positions. Instead, the address type bits are adjusted to maintain the MEM0 address range at 64 GB. The space between the bottom of IO and the top of MEM0 is thus 1984 GB. However, because the left-hand bits for this address type are all zeros, the left-hand end of the addresses is effectively unchanged.

An additional address type, Memory 2 (MEM2) has been added to use some of this space. In the example shown in Table 2, MEM2 contains eight 64 GB address regions that may be used, for example, for additional MEM1 resources. More than eight regions could be fitted into the available space. However, in the example of Table 2, sufficient MEM address regions are present without additional MEM2 addresses. Bit 38, the fifth bit from the left in Table 2, is the first difference between the left sides of Tables 1 and 2 apart from the carve-out from MEM1 for SPEC. The similarity in the left side decode patterns for the different address space sizes assists in a simple and efficient implementation.

TABLE 3 shows one example of how an address space within a partition of a computing system may be structured, using the same general structure as in Tables 1 and 2, with an address field 49 bits wide, giving a total address space of 512 TB. In the interests of conciseness, the description of parts of Table 3 that are substantially the same as Tables 1 and 2 will not be repeated.

of the corresponding resource that is required for a particular computing system 20 or is expected to be required for a particular class of computing system 20. In each case, the maximum is less than the available address size for the respective address type. In address type MEM1, an additional bit, shown as a 0 and having no function, is inserted between the region number and the address part of the address field. In address type IO, and additional 0 bit is inserted before the region number.

As is shown by a comparison of Tables 2 and 3, the address ranges are defined by identical most significant bits.

The different placement of the additional bits for different address types has the advantage of allowing specific bits, for example, the most significant bits of the address region or address, to be aligned for different address types, simplifying the address structure. In other instances, it may be preferred to place the additional bits so as to reduce overlap between different address types.

In the example of Tables 1 to 3, a set of rules for assigning the type bits as the address length varies, expressed as pseudocode, might be as follows. For each rule, the address type is identified. Following the address type are bit pattern match rules. Within these rules:

n is the number of significant bits in the address, or the address width; the notation [j: k] denotes the binary-valued field starting at bit j and ending at bit k, where the least-significant bit is bit 0;

the notation x by . . . y denotes a binary-valued field of width x with value y . . . y; and the notation x{by} denotes a binary-valued field of width x with repeating value of y.

For some of the rules, the bit pattern depends on a condition, which is expressed within the rule. If the address condition is not satisfied, and no alternate rule is provided, the address type is not implemented for that address width.

TABLE 3

| Desc | 44 | 43 | 42 | 41 | 40 | 39 | 38 | 37 | 36 | 35:0 |
|------|----|----|----|----|----|----|----|----|----|------|
| SPEC | 1  | 1  | 1  | 1  | 1  | 1  | 1  | 1  |    | Special Address [36:0] |
| MEM1 | 1  | Memory Region [5:0] | | | | | | 0 | | Memory 1 Address [36:0] |
| IO   | 1  | 0  | 0  | 0  | I/O Region [4:0] | | | | | I/O Address [35:0] |
| MEM2 | 0  | 0  | 0  | 1  | Mem R. [2:0] | | | 0 | | Memory 2 Address [36:0] |
| MEM0 | 0  | 0  | 0  | 0  | 0  | 0  | 0  | 0  | 0  | Memory 0 Address [35:0] |

As is shown by a comparison of Tables 2 and 3, the address ranges are defined by identical most significant bits for address types MEM1 and IO. In the example shown in Table 3, the sizes of the address regions for type MEM1 have been increased compared with Table 2. Both in the case of address type MEM1 and in the case of address type MEM0, however, it has been determined that both the number of regions and the size of the regions have reached a maximum. The maximum may be, for example, the maximum number and address size

| | | |
|---|---|---|
| SPEC: | if (n > 36) | [n : 37] == (n − 36){b1} |
| IO: | if (n > 42) | [n : 41] == {2b10, (n − 42){b0}} |
| | else | [n : n − 1] == 2b10 |
| MEM1: | n == 1b1 | and Not (IO) & Not (SPEC) |
| MEM2: | if (n > 39) | [n : n − 3] == 4b0001 |
| MEM0: | | [n : 36] == (n − 35){b0} |

Where n is the most significant bit. Other configurations are possible. For example, the value of n at which MEM2 is introduced depends on how far, and how rapidly, the space assigned to IO increases.

Figure 3:
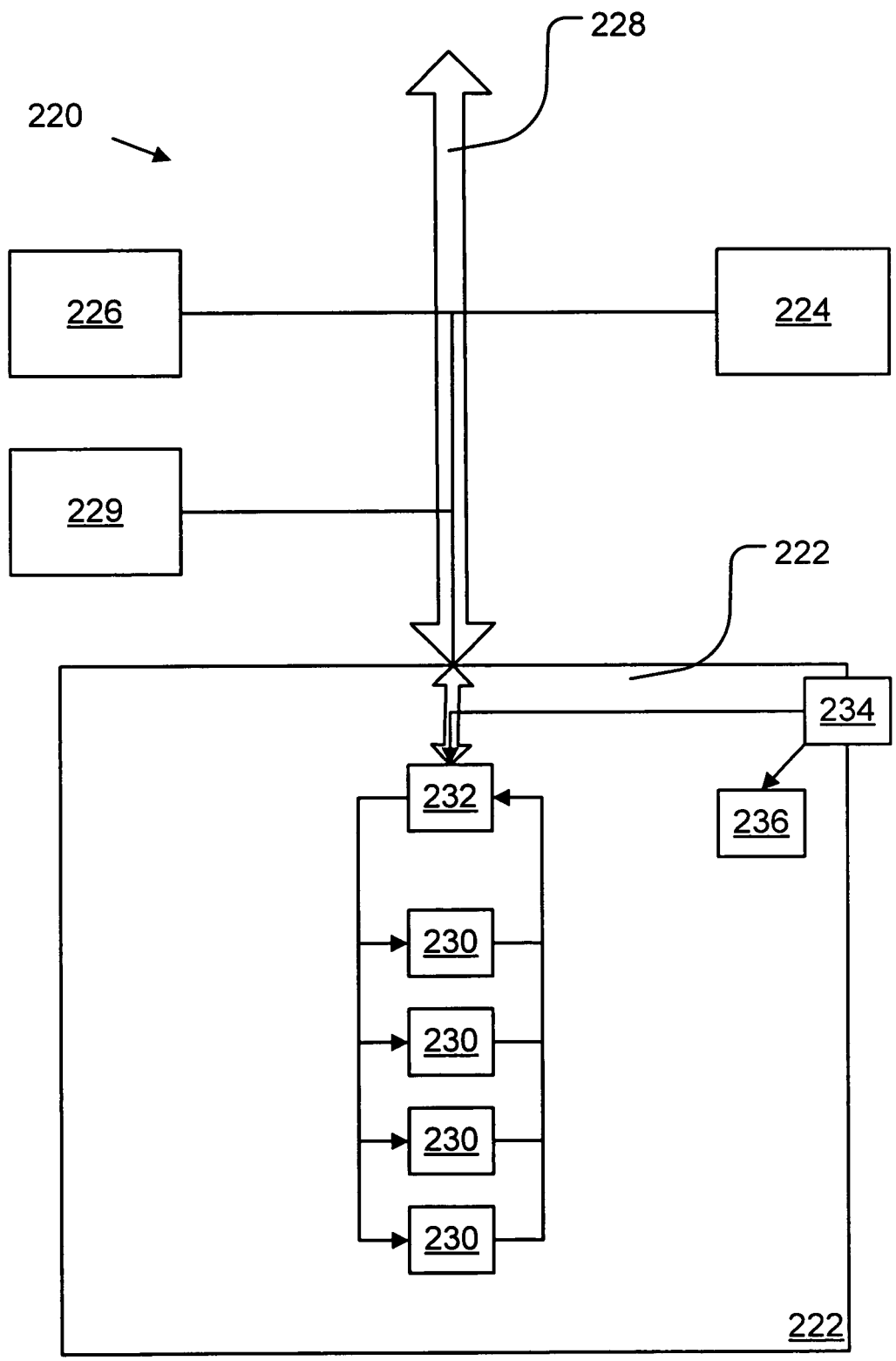
FIG. 3 is a block diagram of part of a second embodiment of a computing system.

Referring now to FIG. 3, a second form of computing system indicated generally by the reference numeral 220 comprises a central electronics complex (CEC) 222, which routes and manages communications traffic between other resources and devices. The other resources and devices may include, for example, a CPU 224, memory 226, a communications bus or other I/O 228, and other devices or resources 229 such as system management subsystems, complex management subsystems, and test ports. The CEC 222 may be connected to multiple I/O, for example, networks, user interfaces, and storage devices. The CEC 222 may be connected to more than one of the same sort of device or resource.

In use, the CEC 222 receives messages from other resources 224, 226, 228. The CEC routes the messages, and may also log or otherwise process the messages.

The CEC 222 is provided with a plurality of address decoders 230, each of which is preconfigured to decode addresses of a specific length formatted according to the system shown in Tables 1-3 or some other suitable system. Each decoder 230 is arranged to receive or extract from the incoming message the bits that, if the specific decoder's address length is correct, are the address bits. That avoids taking time to identify or verify the address length before decoding starts. A decoder controller 232 is arranged to receive an input indicating an active address length. This information may be provided by a control input 234. The decoder controller 232 then receives the outputs from the decoders 230, and forwards only the output from the decoder 230 for the active address length. The output may indicate the destination to which the message is to be sent, the type of the message or recipient, or both. In response to the output from the decoder 230, further messaging logic 234 appropriately processes the message. For example, the messaging logic 234 may forward the message to one of the resources 224, 226, 228. For example, the messaging logic 234 may log the message, or some types of message, into a log 236. For example, the messaging logic may change the message, for example, by converting it to a different address space or a different address structure.

Figure 4:
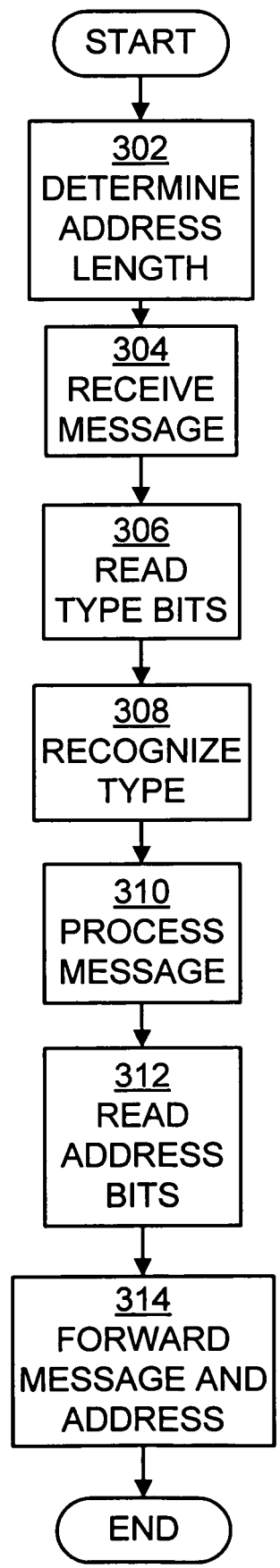
FIG. 4 is a flowchart of a second embodiment of a method.

Referring also to FIG. 4, in step 302 the CEC 222 obtains information indicating the size of the address space. The size of the address space may be determined and specified as part of a configuration or startup process. The size of the address space may be different for different resources 224, 226, 228, in which case the decoder controller 232 may maintain a concordance of source to address size, and receives and responds to the sources of incoming messages. The bus 228 may carry messages from remote resources with different address sizes, in which case incoming messages may be accompanied by an additional header or control signal that indicates the address size or source of the message.

In step 304, the CEC 222 receives a message. In step 306, the decoder 230 reads the type bits, or the type and block bits of the address field in the incoming message, which enable the CEC 22 to identify in step 308 the type of device or other resource to which the message is directed. As explained above, where there are separate decoders 230 for different address lengths, different decoders may make different attempts to interpret the address, and the decoder controller 232 may then select the correct interpretation. In step 310 the CEC 222 processes the message in a manner appropriate to the identified resource type. For example, the CEC 222 may log messages directed to specific resource types, or may convert the message address into a form appropriate to the specific resource type or resource, or to a part of the computing system where that resource resides.

In step 312, the CEC 222 reads a number of less significant bits in the address field, forming an address appropriate to the resource type and the address field length. Where the sum of the number of bits in the address range and the number of bits in the address is less than the length of the address field, an appropriate number of additional bits in the address field between the address range and the address are ignored or discarded. As explained above with reference to Table 3, the ignored bits may be between address type bits and address region bits, between address region bits and address bits, or both. In some cases, the CEC 222 may read less than the whole address, for example, if the type, or type and region, provide all the information the CEC needs for processing and further routing of the message, and the address itself is not logged or otherwise processed.

Various modifications and variations can be made in the present invention without departing from the spirit or scope of the invention.

For example, a CEC 222 has been described in which several address processors 230 attempt to analyze a message address in parallel, and the address processor controller 232 selects the output from one of the address processors 230. That arrangement can be fast, because the individual address processors 230 can be optimally configured and hard-wired for a single address length, and because the decision of what address length is correct can be made in parallel with the analysis of the address. However, a configuration in which the address processor controller 232 first identifies the address length, and sends the message to only the correct address processor 230, is also possible, and may be more economical of energy. A CEC 222 with a single address processor 230 that processes the incoming message differently depending on the address length is also possible. The latter arrangement may be more economical of hardware, because only one address processor is used, but slower, because the address analysis may be written in software that loads or branches conditionally depending on the address length.

Tables 1 through 3 show specific examples of address structures for address spaces of different lengths. The number of different address types, the specific address types defined, the number of regions for each address type, and the size of each address region may be selected depending on the architecture of a particular computing system with which the addressing system is intended to be used.

Thus, it is intended that the present invention cover the modifications and variations of this invention provided they come within the scope of the appended claims and their equivalents.

What is claimed is:

1. A method of interpreting an address, comprising:
   determining a value for an address length;
   reading type bits from a high end until an address type is recognized;
   reading from the address further bits the number and position of which is determined by the address type and the address length; and
   for an address of at least one address type and at least one address length, ignoring one or more bits between the type bits and the further bits.

2. A method according to claim 1, wherein for at least one address type the address comprises region bits and address bits, wherein reading further bits comprises reading at least region bits, and wherein ignoring one or more bits comprises ignoring at least one of a bit between the type bits and the region bits and a bit between the region bits and the address bits.

3. A device for routing messages in an address space, comprising logic arranged to:
receive a message with an address;
obtain an address length of the address;
read values of first bits at a high end of the address to identify an address type;
extract a number of second bits at a location in the address dependent on the identified address type and the address length;
process the message in dependence on the address type and the extracted second bits of the address; and
ignore one or more additional bits between the first bits and the second bits for an address of at least one address type and at least one address length.

4. A device according to claim 3, responsive to at least one of a control input, a source of a message, and a message header to process messages with addresses of a length indicated by the at least one of control input, source of message, and message header.

5. A device according to claim 3, further comprising logic arranged to process in parallel addresses of different lengths, and responsive to the obtained address length to process the message in accordance with the logic arranged to process addresses of the obtained address length.

6. A device according to claim 3, further comprising logic arranged to recognize addresses with different numbers of first bits for different address types.

7. A device according to claim 3, further comprising logic arranged to recognize addresses of first and second types wherein the number of first bits is greater for the first address type than for the second address type, and the number of second bits is greater for the second address type than for the first address type, whereby for at least one length of the address space there is a bit that is a first bit for the first address type and a second bit for the second address type.

8. A device according to claim 3, further comprising logic configured to recognize addresses of at least one type wherein the number of second bits is dependent on the address length, the logic being configured to ignore one or more additional bits when the size of the address field minus the number of first bits for the at least one address type is greater than a maximum number of second bits.

9. A device according to claim 8, wherein the second bits comprise region bits and address bits, the logic being configured to ignore one or more additional bits selected from bits between the type bits and the region bits and bits between the region bits and the address bits, when the size of the address field minus the number of first bits for the at least one address type is greater than a number selected from a maximum number of region bits, a maximum number of address bits, and a maximum total number of region and address bits.

10. A device according to claim 3, wherein at least one address type provides addresses for a plurality of devices, further comprising logic configured to select at least one of the number of devices and the number of addresses per device in dependence on the size of the address field.

11. A device according to claim 3, further comprising logic configured to identify blocks of unused address space represented by alternative values of the additional bits in a longer address, and to recognize at least one value of at least one additional bit as identifying an additional type.

12. A device according to claim 11, comprising logic configured to recognize addresses of at least one additional type as additional addresses for another address type.

13. A device according to claim 3 for routing messages in two or more address spaces with addresses of different lengths, comprising logic configured for at least one address type present in at least two of the address spaces to read different second bits of said at least one address type in the at least two address spaces.

* * * * *